April 3, 1956  J. E. WHITE ET AL  2,740,489
SHEAR WAVE SEISMIC EXPLORATION
Filed May 8, 1952  5 Sheets-Sheet 1

JAMES E. WHITE
STANLEY N. HEAPS
INVENTOR.

BY
AGENT

JAMES E. WHITE
STANLEY N. HEAPS
INVENTOR.

BY
AGENT

April 3, 1956  J. E. WHITE ET AL  2,740,489
SHEAR WAVE SEISMIC EXPLORATION
Filed May 8, 1952  5 Sheets-Sheet 3

JAMES E. WHITE
STANLEY N. HEAPS
INVENTOR.

BY D. Carl Richards
AGENT

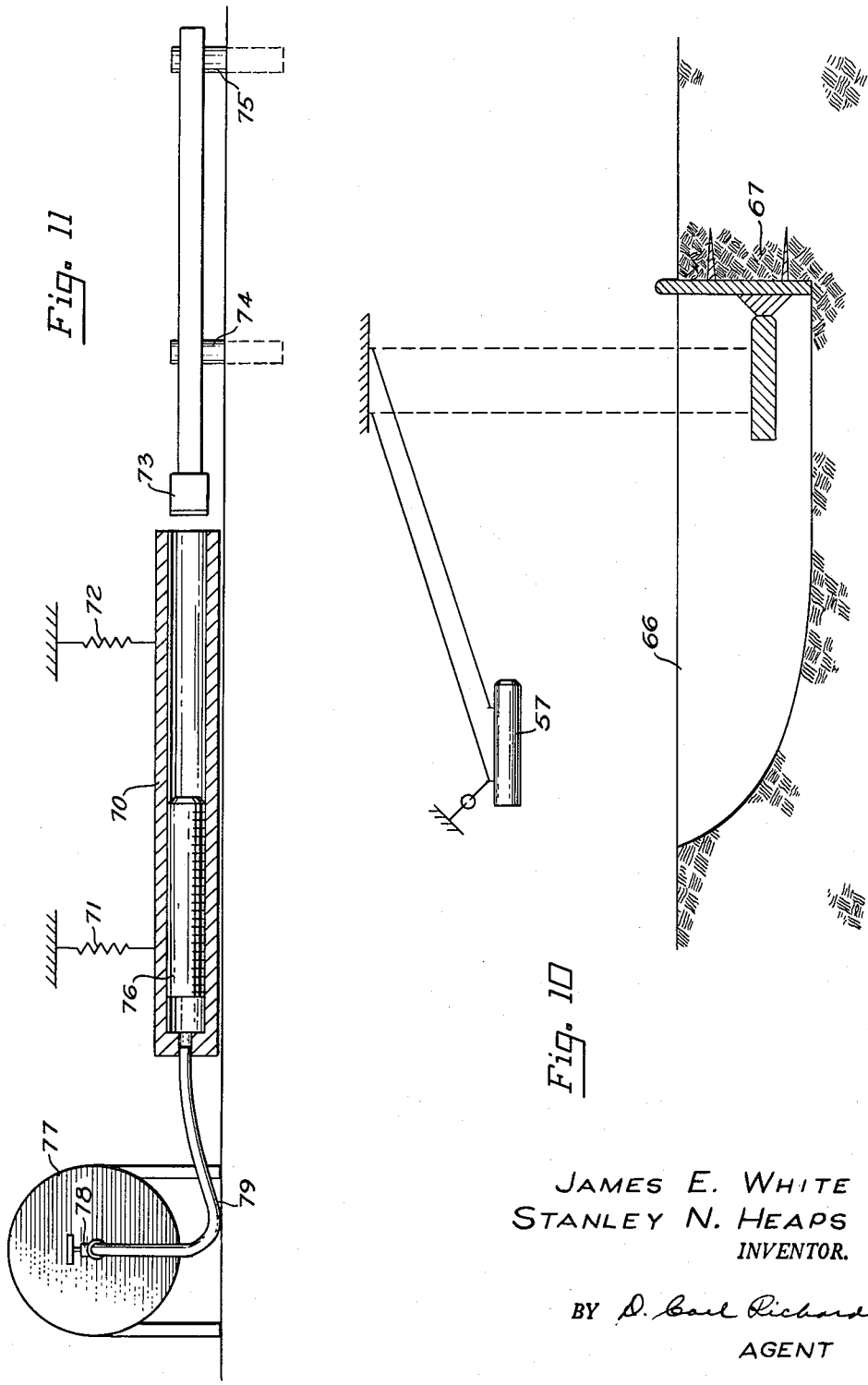

April 3, 1956   J. E. WHITE ET AL   2,740,489
SHEAR WAVE SEISMIC EXPLORATION
Filed May 8, 1952   5 Sheets-Sheet 5
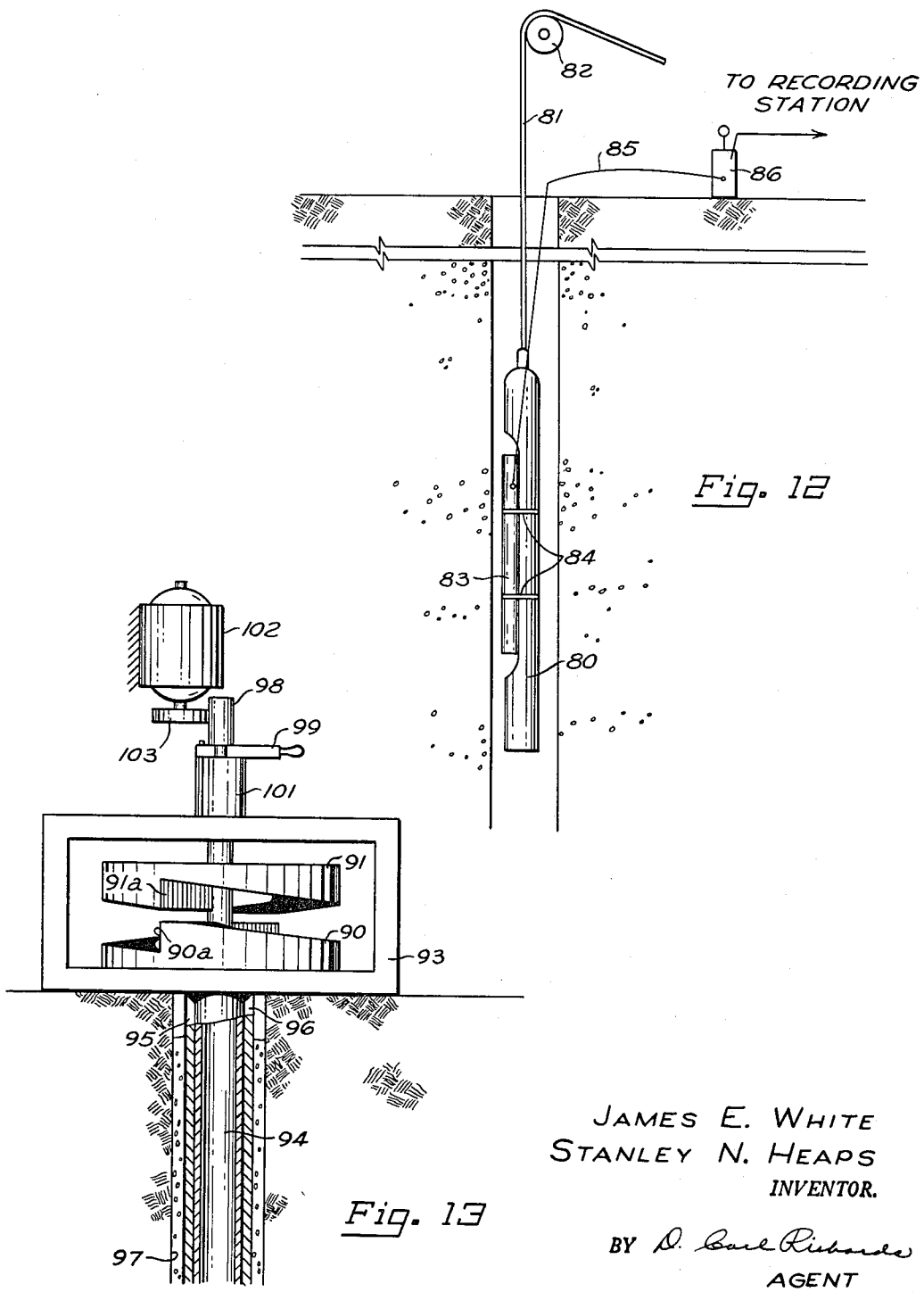
JAMES E. WHITE
STANLEY N. HEAPS
INVENTOR.
BY D. Carl Richards
AGENT

United States Patent Office 2,740,489
Patented Apr. 3, 1956

2,740,489

SHEAR WAVE SEISMIC EXPLORATION

James E. White and Stanley N. Heaps, Dallas, Tex., assignors, by mesne assignments, to Socony Mobil Oil Company, Inc., a corporation of New York Application May 8, 1952, Serial No. 286,760

7 Claims. (Cl. 181—.5)

This invention relates to seismic exploration and more particularly to the use of shear waves for the location of subsurface reflecting interfaces.

Seismic exploration has been extensively used for delineation of subsurface formations. Vibrational motion of the earth's surface, moving in a compressional mode, has been utilized most extensively as the basis for determining earth structure. This parameter while extremely useful and successful in many areas is subject to limitations that impede the continued discovery and development of petroleum resources.

Shear waves, that is waves in which particle motion is in a direction normal to the direction of propagation, offer advantages not possible in the use of compressional waves. The velocity of a shear wave through a given medium is in the order of one-half the velocity of a compressional wave. For a given frequency shear waves occupy much less space along the travel path than do compressional waves and therefore offer the possibility of greater resolution, the detection of thinner beds with greater accuracy than is possible with compressional waves. The reflection coefficients affecting a shear wave at an interface between two contrasting acoustic media express themselves differently than with respect to compressional waves.

It is therefore an object of the present invention to provide for the generation of shear waves polarized in a direction normal to the paths customarily employed in reflection and refraction seismograph techniques. It is a further object of the invention to provide for the reception and recordation of shear waves after reflection from subsurface acoustic discontinuities.

In accordance with the present invention there is provided a system for seismically exploring the earth's crust utilizing shear waves which comprises a mass located at a sending station on the earth's surface with means for propelling the mass along a traverse at least in part horizontal for generating horizontally polarized shear waves in adjacent earth strata. At a receiving station spaced from the sending station there is provided detecting means responsive to horizontal earth movements parallel to the traverse of the mass for detecting the horizontally polarized shear waves to produce a plurality of output signals related in time to the instant of generation of the shear waves as the subsurface reflecting interfaces which produce reflections of the energy are related in space to the earth's surface.

For a more complete understanding of the present invention and for further objects and advantages thereof, reference may now be had to the following description taken in conjunction with the accompanying drawings in which:

Fig. 10 is a further modification of a shear wave generating system;

Fig. 11 is a further modification of shear wave generation;

Fig. 12 illustrates use of an explosive charge for generating shear waves; and

Fig. 13 illustrates shear wave generation by use of a rotational source.

Figure 1:
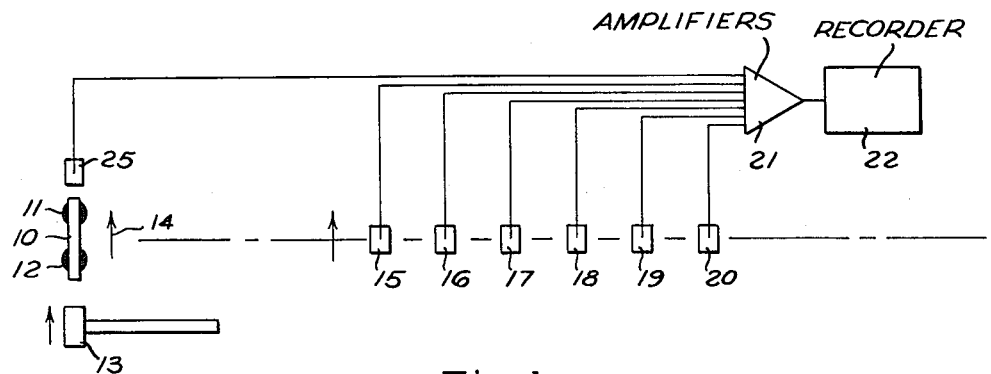
Fig. 1 is a plan view schematically illustrating use of shear waves in seismic exploration.

Referring now to Fig. 1 where a system for utilizing shear waves for seismic exploration is schematically illustrated, a target 10 of suitable design is fastened to the earth as by suitable anchoring means 11 and 12 buried in the earth's surface. A mass such as a hammer 13 is directed to impinge the target 10 during a portion of its traverse which is horizontal and parallel to the direction vector 14. Upon impact a shear wave is produced characterized by particle motion parallel to the direction of vector 14. The shear wave is propagated in all directions from the point of generation but at any point, particle motion is perpendicular to the direction of propagation. Thus shear waves travel along the earth's surface and also down into the earth in a direction normal to vector 14 with particle motion parallel to vector 14. Such waves travel through surface formations and may be refracted or reflected to impinge on detectors spaced at receiving stations located along a line normal to vector 14.

Six detectors 15–20 are positioned along the line normal to vector 14. The detectors are oriented for detection of earth movement along lines parallel to vector 14. The detectors 15–20 are connected through suitable signal channels to amplifying means 21 which in turn is coupled to recorder 22 for recording the signals generated by detectors 15–20 in response to earth movement. An additional detector 25 is coupled to the earth at or adjacent to the sending location for generation of a signal corresponding with the instant of impact of the weight 13 on target 10. Thus there is produced at the recorder 22 a first signal corresponding in time with the generation of shear waves and additional signals spaced in time with reference to the first signal in the same manner as subsurface reflecting interfaces having shear reflection properties correspond in space to the surface of the earth, thus providing means for determining the nature of the earth strata between the source and the detectors. From the standpoint of the travel of seismic waves, the formations at any point along any real travel path between the transmitting station and receiving station may properly be considered as being between them and for the purpose of the present description will be thus referred to.

Figure 2:
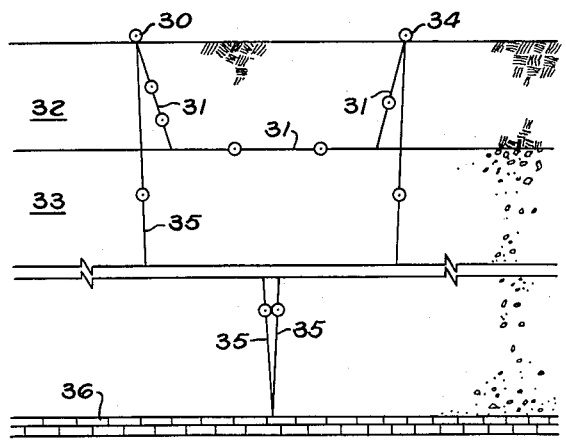
Fig. 2 is a sectional view through the earth illustrating one mode of shear wave propagation.

Referring to Fig. 2, a first mode of the propagation of shear waves has been illustrated in a sectional view of a portion of the earth's surface. The arrow 30 directed into the plane of the paper represents motion upon impact of the mass 13 on the target 10 of Fig. 1. The energy in the resultant shear wave is propagated along a refraction path 31 including the interface between a surface formation 32 and a subsurface formation 33 to a receiving station 34. The direction of particle motion associated with the shear wave remains at all times parallel to the surface of the earth in the refraction path as indicated by arrows directed into the plane of the paper. Similarly the shear wave energy may travel along a reflection path 35 to a relatively deep subsurface interface 36 and thence to the receiving station 34. In this case also the particle motion of the shear wave energy is along lines parallel to the surface of the earth and to the direction of impact of the weight or hammer 13 on the target 10. Fig. 2 then corresponds in section with the plan view of Fig. 1.

Figure 3:
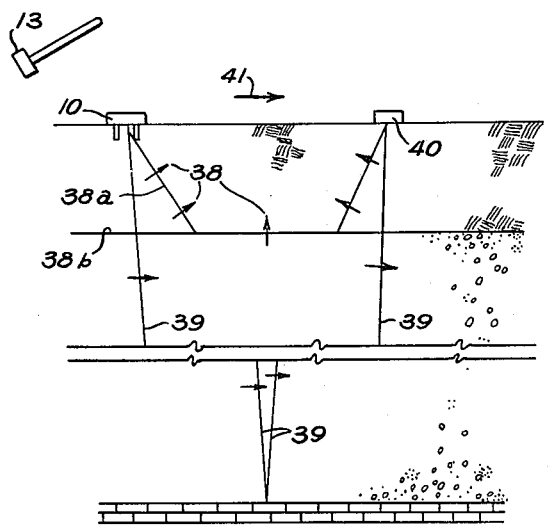
Fig. 3 is a similar section showing a different mode of propagation of shear waves.

In constrast, Fig. 3 illustrates a system in which the mass 13 strikes the target 10 in a direction such that the receiving station is along a line which is included in the plane of the motion of the mass 13. In this case, as indicated by the arrows 38, particle motion for refracted energy is not parallel to the earth's surface. However, the reflection path 39 is substantially normal to the earth's surface so that the particle motion is parallel to the earth's surface, and a detector positioned at the receiving station 40 sensitive to earth motion in a direction parallel to the arrow 41 and parallel to the earth's surface would produce signals representative of and dependent upon shear waves traveling into the earth.

In a system such as shown in Fig. 3, shear wave energy traveling along the path 38a, upon reaching the shallow interface 38b is transformed, at least in part, into compressional energy which may then give rise to relatively complex motion at the earth's surface. Interpretation of the resultant motion in terms of subsurface structure may be most difficult, and it is therefore apparent that the system illustrated in Figs. 1 and 2 is preferable to the system of Fig. 3. In the former, particle motion at the detector is restricted substantially entirely to shear wave energy and the interference at the receiving station due to compressional waves generated upon impact and/or transformation at a shallow interface is minimized.

Figure 4:
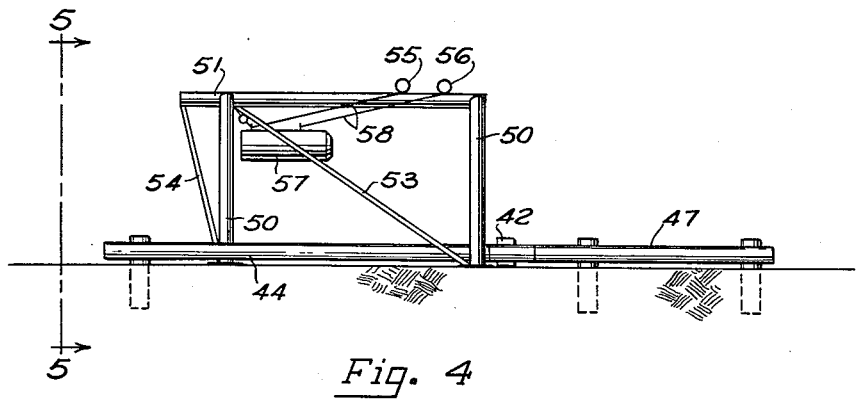
Fig. 4 is an elevation view of one form of shear wave generator suitable for carrying out the present invention.
Figure 5:
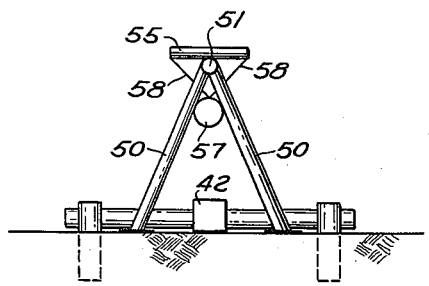
Fig. 5 is an end view of the generator of Fig. 4 looking from line 5—5 of Fig. 4.
Figure 6:
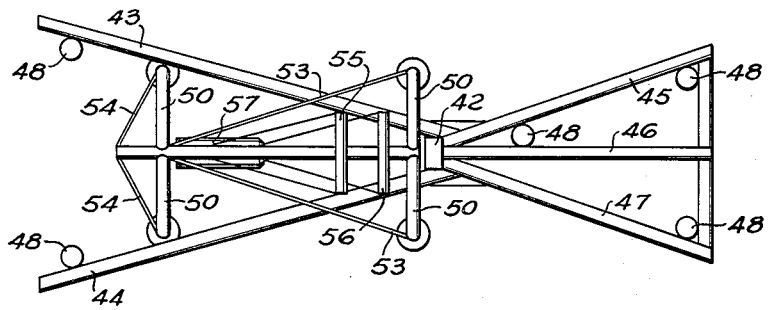
Fig. 6 is a top view of the generator of Fig. 4.
Figure 7:
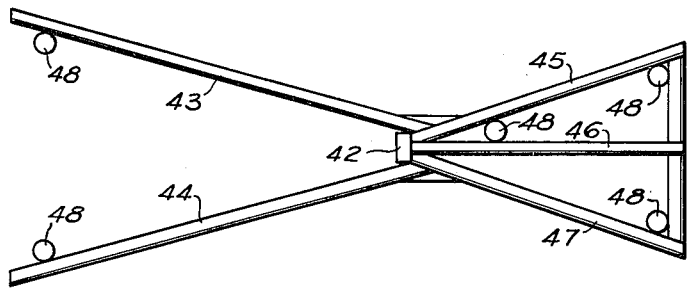
Fig. 7 is a top view of an anchoring system to be used with the generator of Fig. 4.

Figs. 4–9 illustrate a pendulum device for the generation of shear wave energy of sufficient magnitude to enable one to investigate to considerable depths the character of the earth's crust. An earth coupling unit, best seen in Fig. 7, includes a target 42 of relatively low mass, rigidly coupled to and supported by a framework including arms 43, 44, 45, 46 and 47. The framework is an integral unit securely welded at and adjacent to the target 42. A plurality of ground anchors such as pipes extending a few feet into the earth's surface are connected as by clamping or welding to the framework members. In Fig. 7 five such anchors 48 are illustrated. In Fig. 4 the framework is shown positioned preferably level on the surface of the earth at a sending location. A suitable structure is provided to support a mass which upon release may be dropped along an arc to impinge the target 42.

Figure 8:
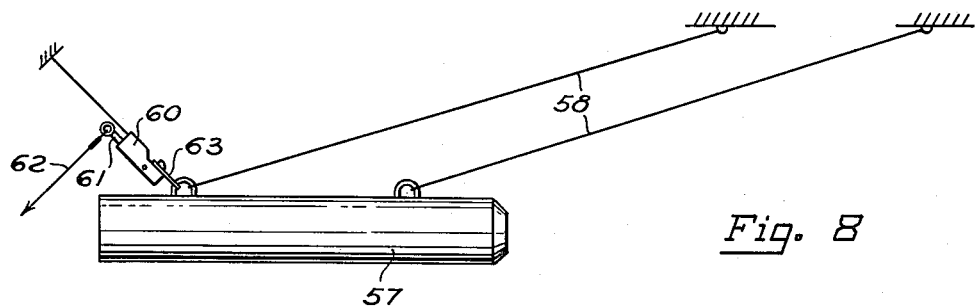
Fig. 8 illustrates suspension of the mass together with releasing means.
Figure 9:
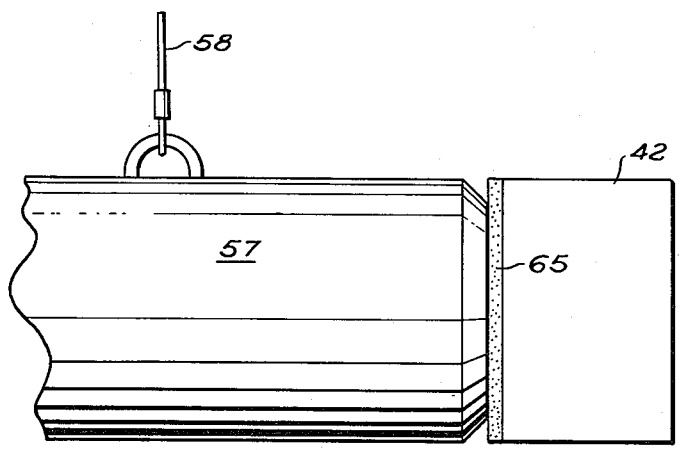
Fig. 9 illustrates the mass in contact with the target.

More particularly, referring to Figs. 4–6, legs 50 support a ridge pole 51 with the lower end of the legs braced from the ridge pole by bars 53 and 54. A pair of cross arms 55 and 56 are carried by and arranged perpendicular to the ridge pole and are rigidly connected thereto adjacent to the right hand end of the support as viewed in Fig. 4. A mass 57, a metallic cylinder of iron for example, is suspended as by cables 58 from the extremities of the cross arms 55 and 56. As best illustrated in Fig. 8, the cylinder or weight 57 is latched near the top of an arc measured by the length of the cables 58 by a mechanism 60 which includes a hooked portion together with a triggering arm 61 to which there is connected a cable 62 or other releasing means.

When tension is applied to the cable 62, a ring 63 connected to cylinder 57 and held by the latching device 60 is forced from the hooked portion allowing the cylinder 57 to fall in an arc restricted by cables 58. At the point of maximum momentum, at the bottom of the arc the cylinder 57 impinges the target 42 in the manner illustrated in the enlarged Fig. 9. The cylinder 57 may be provided with a cushion or sheath 65 made of a resilent material, such as neoprene rubber, to alter or in some cases control the frequency characteristics of the energy imparted at the target 42 and its associated structure.

Target 42 and associated structure including the framework and anchoring pipes illustrated in Fig. 7 and the earth to which they are attached comprise a resiliently supported system having a natural vibration frequency. The foregoing structure together with the membrane 65 reacts with the weight or mass 57 to impart a pulse to the earth whose character may to some degree be controlled by the thickness of the membrane 65 and its resilient properties. In practice the membrane 65 may eliminate transmission of high frequency components to the target 42 thereby to eliminate or minimize as much as possible high frequency noises from the record subsequently to be produced. This may be particularly true when the target is anchored in rigid surface formation.

In the system illustrated in Figs. 4–6 the target is at or adjacent the plane of the earth's surface. In the system illustrated in Fig. 10 a trench 66 is provided with an abrupt vertical face at one end and a target member 67 mounted there-against for receiving the cylindrical weight 57 at the lower end of its arcuate traverse. In some areas the trenched arrangement may be preferred to the coupling member of Fig. 7.

While not shown in Figs. 4–10, it will be preferred, as above indicated, to space detector geophones along a line normal to the plane of the trajectory of the moving mass 57 and orient them for detection of the polarized waves.

In Fig. 11 another modification of the source is illustrated and comprises a cannon 70, which in the form illustrated, is suspended from a suitable support by a pair of springs 71 and 72 with its muzzle adjacent a target 73. The target is anchored to the earth as by pipes 74 and 75. A piston or cylindrical weight 76 is fitted in the bore of the cannon for impact on target 73 when suitably propelled through the cannon. Energy is imparted to the weight 76 by means of compressed air from a tank, such as tank 77, connected by way of a valve 78 and a hose 79 to the chamber of the cannon 70. A suitable latching and triggering mechanism (not shown) may be provided for restraining the weight 76 at or near the breech end of the cannon 70 with air pressure from the tank 70 applied to the cannon. Such latching mechanism may then be actuated to release the weight at a desired instant.

In this modification the cannon muzzle will preferably have a mass large compared to that of the weight 76 so that the displacement of the barrel, when air pressure is applied to the chamber, will be small compared to the displacement of the weight. It will be apparent that it would be entirely satisfactory to mount the cannon on the target structure for the acceleration of the entire structure upon application of air pressure to the cannon would be small compared with the acceleration upon impact of the weight upon a suitable target. Other modifications, of course, may be made to provide a suitable propelling and target system.

Still a further means for generating shear waves of the type herein discussed is illustrated in Fig. 12 in which an iron mass 80 is suspended as by a cable 81 threaded over a supporting pulley 82 as to be lowered into and raised from a bore hole penetrating the earth. The mass 80 at a central section is shown milled away to accommodate or receive an elongated explosive charge, such as charge 83, which may be secured to the mass 80 by tape or other suitable bindings 84. A firing circuit 85 leads to the surface where it is connected to a blaster 86 of conventional design. Upon detonation of the explosive charge the energy imparted to the formations adjacent the charge is biased by the presence of the mass 80. Mass 80, possessing inertia, is resistive to rapid accelerations and thereby imparts a strong directional characteristic to the explosion in a horizontal plane with resultant polarization in a horizontal plane.

The foregoing structure, together with suitable means for controlling its rotational orientation or in the alternative of determining the rotational orientation, provides a means for generating a shear wave of given polarization thereby properly to orient the detecting geophones. In the form illustrated the geophones should be oriented as to be sensitive to waves polarized along a line lying in a plane which passes through the axes of both the weight 80 and charge 83.

Referring now to Fig. 13, there is illustrated still another form of shear wave generator. A pair of cylindrical members 90 and 91 are positioned in a spaced apart relation with adjacent faces thereof provided with caming surfaces. The vertical teeth or jaws 90a and 91a are provided in opposing relation for positive engagement when the upper member 91 is lowered onto the member 90. The lower member 90 is rigidly fastened to a framework 93 and to an anchoring pipe 94. Pipe 94 may be provided with fins 95 and 96 extending longitudinally therealong for securely anchoring the pipe in the bore hole 97. As illustrated, the space between the pipe and the bore hole walls is filled with concrete.

The upper member 91 is mounted on shaft 98 and is suspended above member 90 by means of a bar 99 engaging a circumferential groove near the upper end of shaft 98. When thus suspended, upper member 91 may rotate freely on the shaft 98. The shaft 98 is mounted in bearings 101 and a second bearing centrally located in member 90. A motor or other power source 102 is provided for driving the shaft 98 when in the latched position. As illustrated, the motor 102 drives a pully 103 which in turn frictionally engages the shaft 98.

In operation, motor 102 is energized with the upper member 91 in its latched position. The device is rotated to impart to member 91 substantial angular momentum. At the desired instant the bar 99 is removed from the groove in the shaft 98 allowing the upper member 91 to drop into engagement with lower member 90. There is thus imparted at the earth a twisting force symmetrical about the axis of the bore hole 97, productive of a shear wave propagated in all directions in the earth from the bore hole 97. Resilient means (not shown) may be provided between the camming surfaces of members 90 and 91 to modify the character of the shear wave impulse and also to minimize the vertical compressional energy transmitted by reason of the fall of the mass 91 onto member 90. However, the ratio of shear wave energy to compressional energy produced by this device is high so that discrimination as to compressional energy is not difficult.

This form of generator is used to generate polarized waves at a selected depth in a bore hole as, for example, below the surface or weathering layer. The depth at which the twisting force is applied is determined by the level of the cementing material around the pipe 94. If pipe 94 is placed in a hole to a depth of 40 feet and the lower 10 feet cemented to the formations and if the weathering interface is shallower than 30 feet, energy transformation, producing unwanted noise waves, may be minimized. The device may, however, be mounted on an anchoring device of the type generically shown in Fig. 7 for surface actuation.

Any of the devices above described may be found satisfactory for generation of shear waves for practicing the method of the present invention. In so far as wave generation is concerned, the problem is principally one of imparting sufficient shear wave energy to the earth to penetrate depths of interest for the production of reflections of sufficient amplitude to be above the natural seismic unrest. It will be apparent that generators other than those specifically disclosed may be used for generation of shear waves, and the modifications herein described have been presented for the purpose of illustration and are not to be taken as limiting the scope of the invention.

Further, in connection with the use of any of the foregoing devices, there will be provided suitable means for generating an electrical signal coincident with or indicative of the instant the shear wave is imparted to the earth formations. As in Fig. 1, a geophone buried in the earth's surface at the sending location may be utilized. In connection with any of the devices a strain gauge operable on impact of the weight is suitable. The blaster 86 of Fig. 12 may be of the type illustrated in the Minton Patent No. 2,160,224, particularly Fig. 21, which, together with its associated circuits, produces a suitable time break signal.

A detector suitable for use in connection with the present invention is illustrated in the patent to Loper et al. No. 2,587,346. Alternatively, there is available on the market a geophone, type EVS-H, manufactured and sold by Electro-Technical Labs, Inc., 504 Waugh Drive, Houston, Texas, that has been found to be satisfactory.

In actual practice the use of a mass having high momentum for generating a signal in the earth has been found to be preferable to the biased explosive charge such as illustrated in Fig. 12 for the reason that shear waves of substantially higher frequency are thus generated. In some locations it has been found that the use of the weight will produce shear waves in the order of 20 to 40 cycles per second, whereas in the same area the biased shot such as illustrated in Fig. 12 produces shear waves of frequency less than 10 cycles per second. In the latter case much of the advantage gained by the use of shear waves is militated against by reason of the low frequency. The use of higher impact forces on a more rigid coupling in general raises the frequency of energy imparted to the earth in its shear waves and thus produces a more advantageous wave tool for the study and delineation of subsurface formations.

The source device for generation of the seismic shear waves, particularly as illustrated in Figs. 4–10, is described and claimed in the co-pending application of Stanley N. Heaps for Seismic Shear Wave Generator, S. N. 286,663, filed May 8, 1952. The expansible gas drive source of the type illustrated in Fig. 11 is described and claimed in the co-pending patent application of James E. White and John A. Lee for A System for Generating Horizontally Polarized Shear Waves, S. N. 286,759, filed May 8, 1952.

While the invention has been illustrated and described by certain modifications thereof, it will be apparent that other modifications may now suggest themselves to those skilled in the art, and it is intended to cover such modifications as fall within the scope of the appended claims.

What is claimed is:

1. A system for seismically exploring the earth's crust with shear waves which comprises a mass located at a sending station, means for imparting a high momentum to said mass having motion at least in part horizontal, means coupled to the earth for abruptly decelerating said mass during its horizontal motion for generating at a zero instant horizontally polarized waves in an adjacent earth strata, means for producing a first signal corresponding in time with said zero instant, at a plurality of receiving stations spaced from said sending station detecting means responsive to horizontal earth movements having particle motion parallel to the direction of motion of said mass when horizontal for detecting said horizontally polarized shear waves to produce a plurality of output signals indicative in a time relation with respect to said first signal of the location of interfaces between said sending and receiving stations having contrasting shear moduli with respect to the earth's surface.

2. A system for seismically exploring the earth's crust utilizing shear waves which comprises a mass located at a sending station, means for propelling said mass along a traverse at least in part horizontal, means coupled to the earth for abruptly decelerating said mass during its horizontal motion for generating at a zero instant horizontally polarized waves in adjacent earth strata, means for producing a first signal corresponding in time with said zero instant, at a plurality of receiving stations spaced from said sending station detecting means responsive to horizontal earth movements parallel to said traverse for detecting said horizontally polarized shear waves to produce a plurality of output signals indicative in a time relation with respect to said first signal of the shear properties of formations between said sending station and said receiving stations with respect to the earth's surface.

3. A system for seismically exploring the earth's crust utilizing shear waves which comprises a mass located at a sending station, means for propelling said mass along a traverse at least in part horizontal, structure anchored to the earth's surface and including a target located at the horizontal portion of said traverse for receiving said mass and imparting the energy therein to the earth for generating at the instant of impact horizontally polarized shear waves in the earth's surface strata, means for producing a signal corresponding in time with said instant, at a plurality of receiving stations spaced from said sending station detecting means responsive to the horizontal earth movements parallel to said traverse for detecting said polarized shear waves to produce a plurality of output signals indicative in a time relation with respect to said first signal of the shear properties of formations between said sending and receiving stations with respect to the earth's surface.

4. A system for seismically exploring the earth's crust utilizing shear waves which comprises a mass located at a sending station, means for propelling said mass along a traverse at least in part horizontal, means coupled to the earth for abruptly decelerating said mass during its horizontal motion for generating at a zero instant horizontally polarized shear waves in an adjacent earth strata, means for producing a first signal corresponding in time with said zero instant, at a plurality of receiving stations spaced from said sending station along a line normal to said traverse detecting means responsive to horizontal earth movements parallel to said traverse for detecting said polarized shear waves to produce a plurality of output signals indicative in a time relation with respect to said first signal of the shear properties of formations between said sending station and said receiving stations with respect to the earth's surface.

5. A system for seismically exploring the earth's crust utilizing shear waves which comprises a rigid framework including a target disposed on the earth's surface, means for anchoring said framework at a plurality of points to the surface formation of the earth for resisting movement of said framework in a direction normal to said target, a mass, means for propelling said mass along a traverse normal to and intersecting said target for imparting the kinetic energy of said propelled mass to said surface formation, means for producing a first signal corresponding in time with the instant of impact of said mass on said target, at a plurality of receiving stations spaced from said framework horizontally sensitive detecting means oriented for response to earth movements parallel to the traverse of said mass to produce a plurality of output signals indicative in a time relation with respect to said first signal of the shear properties of formations of the said framework and said receiving stations with respect to the earth's surface.

6. A system for seismically exploring the earth's crust utilizing shear waves which comprises a rigid framework including a target disposed on the earth's surface, means for anchoring said framework at a plurality of points to the surface formation of the earth for resisting movement of said framework in a direction normal to said target, a mass, means for propelling said mass along a traverse normal to and intersecting said target for imparting the kinetic energy of said propelled mass to said surface formation, means for producing a first signal corresponding in time with the instant of impact of said mass on said target, at a plurality of receiving stations spaced from said framework horizontally sensitive detecting means oriented for response to earth movements parallel to the traverse of said mass to produce a plurality of output signals indicative in a time relation with respect to said first signal of the shear properties of formations of the said framework and said receiving stations with respect to the earth's surface.

7. A seismic prospecting system comprising at a sending location a framework rigidly anchored to the earth at a plurality of points and having a target associated therewith for resisting horizontally directed forces, a mass, means for propelling said mass along a trajectory which passes through said target in a horizontal direction for imparting to said earth a horizontally directed force for generation of shear waves, means for detecting the instant of impact of said mass upon said target, at a receiving station displaced along the surface of the earth from said sending station a plurality of detectors sensitive to horizontal vibration and oriented for detection of movements parallel to said trajectory for producing electrical signals corresponding with the horizontal movements at the location of each of said plurality of detectors and means for recording said first signal and said plurality of signals.

References Cited in the file of this patent

UNITED STATES PATENTS

| 2,089,983 | Ricker | Aug. 17, 1937 |
| 2,275,735 | Cloud | Mar. 10, 1942 |
| 2,280,226 | Firestone | Apr. 21, 1942 |
| 2,571,409 | Beyers et al. | Oct. 16, 1951 |
| 2,658,578 | Oliphant | Nov. 10, 1953 |